US008487951B2

(12) United States Patent
Alberth et al.

(10) Patent No.: US 8,487,951 B2
(45) Date of Patent: Jul. 16, 2013

(54) DEVICES AND METHODS OF USER INTERFACES TO GENERATE A HIGH CURRENT DRAIN IMPACT USER NOTIFICATION RELATING TO A WALLPAPER IMAGE

(75) Inventors: William P Alberth, Prairie Grove, IL (US); Zhiming Zhuang, Kildeer, IL (US)

(73) Assignee: Motorola Mobility LLC, Libertyville, IL (US)

( * ) Notice: Subject to any disclaimer, the term of this patent is extended or adjusted under 35 U.S.C. 154(b) by 490 days.

(21) Appl. No.: 12/822,555

(22) Filed: Jun. 24, 2010

(65) Prior Publication Data

US 2011/0316844 A1 Dec. 29, 2011

(51) Int. Cl.
*G09G 5/00* (2006.01)
(52) U.S. Cl.
USPC .......................................... 345/589; 345/619
(58) Field of Classification Search
None
See application file for complete search history.

(56) References Cited

U.S. PATENT DOCUMENTS

| | | | | |
|---|---|---|---|---|
| 6,061,695 A * | 5/2000 | Slivka et al. | .................. | 715/203 |
| 6,166,738 A * | 12/2000 | Robertson et al. | ............ | 715/839 |
| 6,920,606 B1 * | 7/2005 | Jablonski et al. | ............. | 715/202 |
| 7,162,101 B2 * | 1/2007 | Itokawa et al. | ................ | 382/282 |
| 7,202,837 B2 * | 4/2007 | Ihara | ............................. | 345/1.1 |
| 7,952,645 B2 * | 5/2011 | Masuda et al. | ................ | 348/576 |
| 8,194,007 B2 * | 6/2012 | Mori et al. | ....................... | 345/76 |
| 2004/0174374 A1 * | 9/2004 | Ihara | ............................. | 345/582 |
| 2005/0071771 A1 * | 3/2005 | Nagasawa et al. | ............ | 715/765 |
| 2005/0093850 A1 * | 5/2005 | Mori et al. | .................... | 345/204 |
| 2005/0248777 A1 * | 11/2005 | Kim | ................................ | 358/1.2 |
| 2006/0077200 A1 | 4/2006 | Tamayama | | |
| 2008/0106531 A1 * | 5/2008 | Hullot | ........................... | 345/204 |
| 2009/0046106 A1 * | 2/2009 | Park et al. | ..................... | 345/589 |
| 2009/0225005 A1 * | 9/2009 | Furuichi | ......................... | 345/56 |
| 2010/0082414 A1 | 4/2010 | Shimaya | | |
| 2010/0164877 A1 * | 7/2010 | Yu et al. | ........................ | 345/173 |
| 2011/0316844 A1 * | 12/2011 | Alberth et al. | ................ | 345/214 |

FOREIGN PATENT DOCUMENTS

EP 1916647 A1 4/2008

OTHER PUBLICATIONS

T. Nose, et al; "Novel LCD Driver ICs with Built-In Automatic Control Functions for Gamma-curve and Backlight Power"; IDW '07 (The 14th International Display Workshops) Proceedings; Dec. 5-7, 2007; pp. 337-340; DES-1; Japan.
Fergason Patent Properties; "System Synchronized Brightness Control (SSBC (TM)): Dramatically Improving LCD and Projection Images"; 2006; pp. 1-13; Menlo Park, California.
Patent Cooperation Treaty, "Notification of Transmittal of the International Search Report and the Written Opinion of the International Searching Authority, or the Declaration" for International Application No. PCT/US2011/037652, Oct. 6, 2011, 10 pages.

* cited by examiner

*Primary Examiner* — Peter Vincent Agustin
(74) *Attorney, Agent, or Firm* — Paula N. Chavez; Sylvia Chen

(57) ABSTRACT

Disclosed are methods of user interfaces of electronic devices having a displays configured to annunciate wallpaper images wherein a wallpaper image includes image data. Image data can be characterized, for example, by the luminance levels of pixels of the image and/or the power needed to display the image. An image characteristic threshold is related to current drain impact, for example, in terms of luminance and/or power needed to display an image. A disclosed method can include receiving the image data of the wallpaper image and determining whether the image characteristic of the image data (such as luminance level at a given percentile) exceeds the image characteristic threshold. A disclosed method can further provide generating a user interface notification relating to the image characteristic exceeding the image characteristic threshold and relating to the current drain impact of displaying the image as wallpaper.

19 Claims, 7 Drawing Sheets

DEVICES AND METHODS OF USER INTERFACES TO GENERATE A HIGH CURRENT DRAIN IMPACT USER NOTIFICATION RELATING TO A WALLPAPER IMAGE

FIELD

Disclosed are electronic devices, and methods of devices, including user interfaces with displays configured to annunciate wallpaper images and configured to determine whether a wallpaper image has a high current drain impact, and in response, to generate a user notification thereof.

BACKGROUND

The makers of mobile communication devices continue to add power-consuming applications to their devices. For example, cellular telephones include features such as still and video cameras, video streaming and two-way video calling, email functionality, Internet browsers, digital music players, FM radios with stereo audio, and organizers.

Cellular telephones may be PC compatible (e.g., wirelessly via Bluetooth or WiFi, using a wired connection such as USB, etc.) so that files generated or captured on the mobile communication device may be downloaded to a PC. Likewise, data from a PC or other source may be uploaded to the mobile communication device. Moreover, a user may download music and movies to their mobile communication device. Cellular telephones in particular are becoming more than simply mobile communication devices. They are evolving into powerful tools for information management as well as entertainment consoles.

Mobile commerce (M-commerce) is yet another functionality being incorporated into the operations of mobile communication devices. Mobile commerce refers to transactions using a wireless device and data connection that result in the transfer of value in exchange for information, services, or goods. Mobile commerce, facilitated generally by mobile phones, can include services such as banking, payment, and ticketing. Accordingly, mobile communication devices may replace traditional wallets and credit cards. The emerging technology behind m-commerce may transform the mobile communication device into an electronic wallet. As more and more applications are added to mobile communication devices, power conservation techniques are becoming more important.

DETAILED DESCRIPTION

Figure 1:
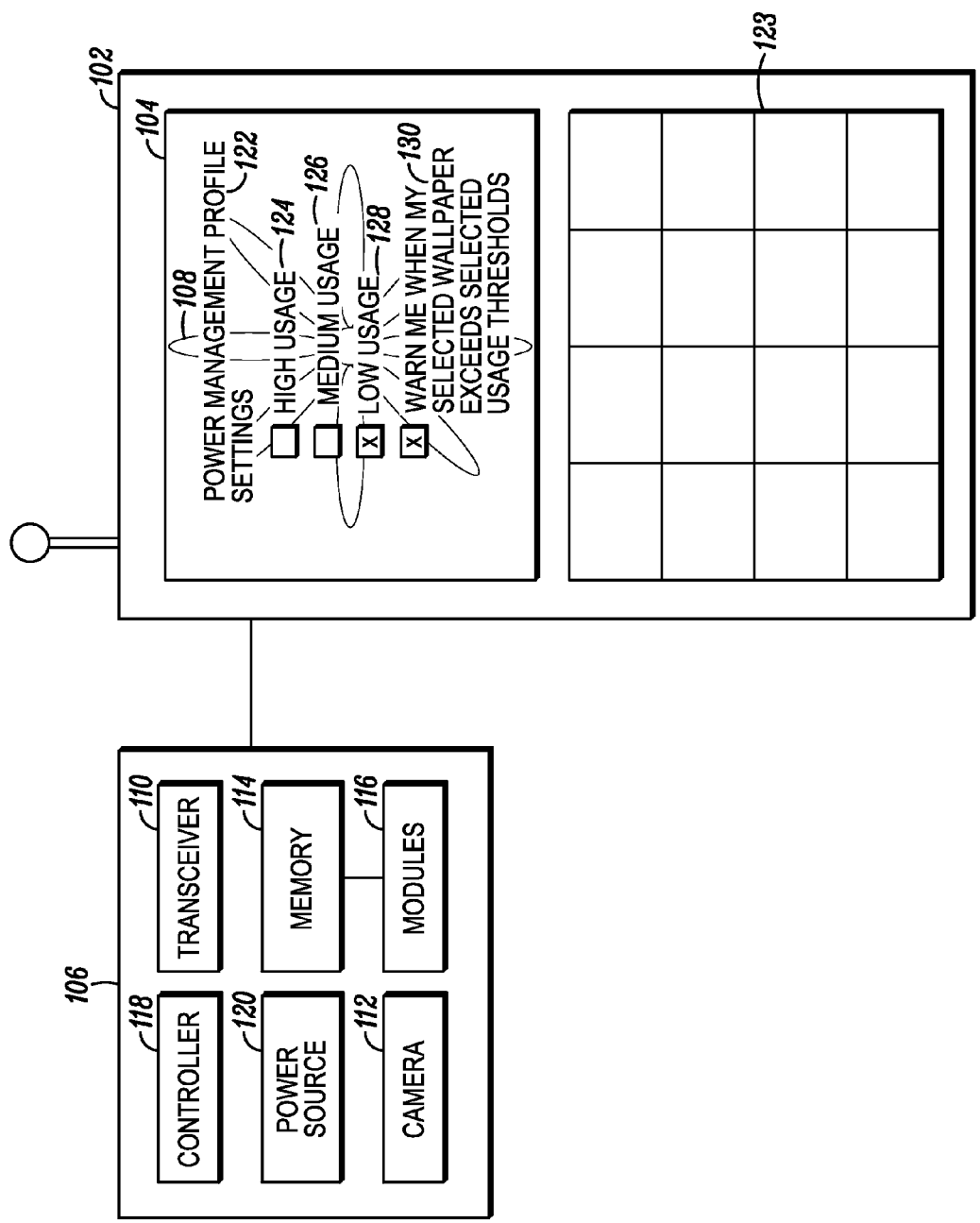
FIG. 1 is an illustration of an embodiment of an electronic device having components and a display with a wallpaper image of a flower.

Computers often provide screensaver options to minimize power consumption while in a rest mode. Moreover, when a computer is working off of its battery power, the computer may adjust its display's brightness output to reduce power consumption. Similarly, mobile communication devices typically blacken their screens after a predetermined time of non-use.

Users of electronic devices, including mobile communication devices, often prefer to personalize their devices with wallpaper images that are displayed while they use their device. A wallpaper image is an image that will cover a screen behind application icons. Different wallpaper images can be used on the same device. For example, a user may have a medley of images, such as collection of family photos, that they may wish to display during their use of the device. Typically video is not used as wallpaper but may be if desired.

Depending on the luminance and chroma content of the wallpaper displayed, it is possible for a user to affect the battery life of a mobile device by 30% or more simply by selecting certain wallpaper images.

Energy conservation, particularly for battery operated devices, will enable a user to operate the device for a longer period of time on a single charge. In the bigger picture, all advancements of energy conservation are beneficial. Most often, power conservation methods are transparent to the user. For example, a device may by default limit certain functionality to conserve power. However, in some devices, a power profile setting is available so that a user may manually select certain variables that affect power consumption.

Content Adaptive Backlight Control (CABC) is a method of fine-tuning backlight brightness by analyzing and processing the display content, which can result in a power saving. Digital signal processes such as CABC, for example, can modulate the grayscale range and the backlight intensity to improve image detail and contrast while reducing the power output required to display an image. Different such digital signal processes exist. While these methods are effective, the power output may be further conserved by choosing wallpaper images that have a low luminance. Luminance is a photometric measure of the luminous intensity per unit area of light traveling in a given direction. The SI unit for luminance is candela per square meter ($cd/m^2$). A non-SI term for the same unit is the "nit." The CGS unit of luminance is the "stilb," which is equal to one candela per square centimeter or 10 $Kcd/m^2$. By limiting the amount of power required to display a wallpaper image on a mobile communication device, and any device having a display, power output for that application can be minimized.

As mentioned above, users often personalize their devices with images of their choosing. Different images can have different luminance values. Higher image luminance leads to higher current drain impact when the image is displayed. A method that would alert a user to the current drain impact of the use of certain images as wallpaper may help a user conserve power of the device.

Disclosed are methods of user interfaces of electronic devices having displays configured to annunciate wallpaper images wherein a wallpaper image includes image data. Image data can be characterized, for example, by the luminosity of the image and/or the power needed to display the image. An image characteristic threshold value is related to a maximum acceptable current drain impact, for example, in terms of luminosity and/or power needed to display an image. A disclosed method can include receiving the image data of the image selected as an electronic wallpaper image, and calculating whether an image characteristic of the image data exceeds the image characteristic threshold value. A disclosed method can further provide generating a user interface notification relating to the image characteristic exceeding the image characteristic threshold value, if the image characteristic exceeds the image characteristic threshold value.

FIG. 1 is an illustration of an embodiment of an electronic device 102 having a display 104 and components 106. An electronic wallpaper image 108 of a flower is depicted. A wallpaper image 108 can be any type of image (including a video), and the simplified flower image is shown here only as an example. A reduction of the power drain impact of displaying a selectable wallpaper image 108 is described in detail below.

The electronic device 102 can be, for example, a mobile communication device as shown. The mobile communication device may be implemented as a cellular telephone (also called a mobile phone). The mobile communication device can represent a wide variety of devices that have been developed for use within various networks. Such electronic devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access, and/or voice over internet protocol (VoIP). The electronic device may also be an electronic picture frame, a desktop computer, or another device that electronically displays images.

Any of several different modes of file transfer or file generation can be used to receive a wallpaper image 108. It is understood that a wallpaper image or video can be provided in any suitable manner. For example, a wallpaper image may be downloaded wirelessly via a transceiver 110, or by wired communication via a USB interface (not shown). Moreover, a camera 112 of the device may be used to take a photo or video which can be stored in a memory 114. A paint application may be a module 116 stored in the memory 114 and in communication with the controller 118 so that a user can create images that can be used as wallpaper.

The modules 116 can carry out certain processes of the methods as described herein. Steps of methods may involve modules, and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

A power management profile settings window 122 of a power management application can allow a user to select a power management profile. In this example, three power management profile options are presented. A user may wish to select a high usage profile 124 when a replacement power source is readily available (e.g., a power transformer is connected, a charger is nearby, a replacement battery is available, etc.) or when a battery power source has a high charge. A user may select a low usage profile 128 when a replacement power source is not readily available or when a battery power source has a low charge. Finally, a user may select a medium usage profile 126 when a battery power source has a moderate charge or as a compromise when a replacement power source is not currently available, but is expected to be available.

Alternate types of power management schemes may be implemented. For example, the power management profile settings screen shown in FIG. 1 could be replaced with a different screen where a user could select the backlight timeout (e.g., never, 5 minutes, 1 minute, 30 seconds), the display timeout (e.g., never, 5 minutes, 1 minute, 30 seconds), and other high-power-consuming settings.

A user can provide input via a user interface, for example, by utilizing a keypad 123, a touch sensitive surface (e.g., to a touch screen or a touch pad), and/or voice recognition, to make a selection such as high usage 124, medium usage 126, or low usage 128. Alternatively, and/or in addition, a default power management profile can be provided. The power source 120 can be a battery (not shown) of the device 102, or can be from another source, such as a wired connection. Wireless power is also a possibility.

A particular wallpaper image 108 has image data. For example, each pixel of an image is included in its image data. Headers and other information can be included in its image data. In particular, a wallpaper image 108 includes image data that has an image characteristic, such as luminance, that can be correlated (e.g., using a histogram) to current drain required to display the image. That is, a histogram of image data can quantify a number of pixels of the wallpaper image 108 that have a given luminance value. The histogram information can then be used to estimate a current drain required to display the image.

A completely white image will have a maximum luminance. Yellow and red have high luminance as well. A completely black image will have a minimum luminance. In the example of the depicted flower wallpaper image 108, if the petals are yellow and the background is white, the luminosity would be high. If the petals are blue and the background is purple, the luminosity would be substantially lower. Luminance values can be correlated to a current drain and/or power output.

In the depicted power management profile settings window 122, were a user to select a particular power usage profile 124, 126, 128, the user may also select to receive a warning 130 when an image characteristic (such as one related to the power required to display a selected wallpaper image) is estimated to exceed a selected image characteristic threshold. Alternatively, the warning may be a default setting. In another embodiment, the user may choose to limit annunciation of a wallpaper image that exceeds a particular image characteristic threshold, which is set based on the default or selected power management profile setting. When a user makes a choice about which wallpaper image 108 to display, a user notification relating to an image characteristic, such a luminance level and/or estimated power output, exceeding the chosen image characteristic threshold can be annunciated.

Figure 2:
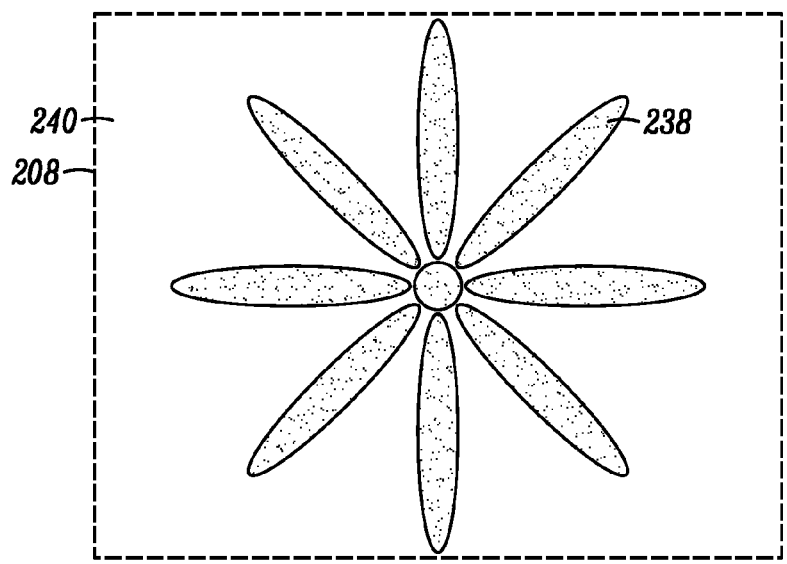
FIG. 2 depicts an embodiment of a wallpaper image similar to the wallpaper image of FIG. 1 where the petals are yellow and the background is white.

FIG. 2 depicts an embodiment of an electronic wallpaper image 208 similar to the wallpaper image 108 (see FIG. 1) depicted on the display 104 where in this example, the petals 238 are yellow and the background 240 is white. As will be described in more detail, FIG. 4 similarly depicts an embodiment of an electronic wallpaper image 408 similar to the wallpaper image 108 depicted on the display 104, however the petals 438 are blue and the background 440 is purple. Their respective luminosity histograms are depicted in FIGS. 3 and 5.

The image data of an electronic wallpaper image 208 or 408, or any other image, can include luminance values for each pixel in the image. The image characteristic in this embodiment is a minimum luminance level representing a given percentile of the pixel luminance values required to annunciate the electronic wallpaper image on the display. The issue is then whether the given percentile of the pixel luminance values of a particular image exceeds the image characteristic threshold value which is discussed in more detail with respect to FIG. 6. As mentioned previously, the image characteristic is correlated to an estimated current drain required to annunciate the image as electronic wallpaper. If the given percentile of the pixel luminance value of a particular image exceeds the threshold value, a user interface notification may be generated, as will be discussed below.

Figure 3:
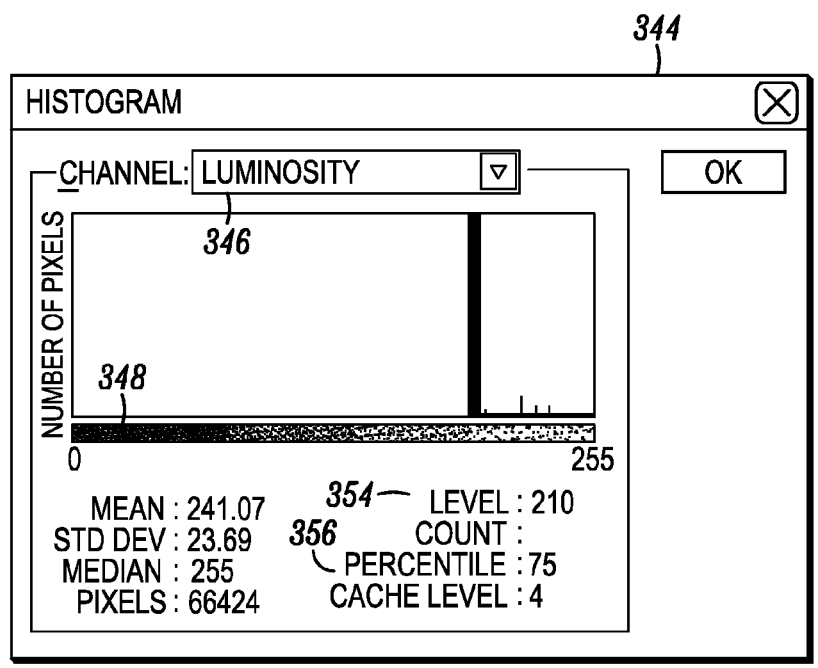
FIG. 3 depicts an embodiment of histogram information of the wallpaper image of FIG. 2.

FIG. 3 depicts an embodiment of histogram 344 information of the wallpaper image 208. The luminosity 346 is characterized by a brightness gradient on the x-axis 348 where the lowest level of luminance is on the x-axis to the left and the highest level of luminance is on the x-axis to the right. Luminance is typically measured in 256 increments (e.g., 0-255) but other scales may be used. On the y-axis is the number of pixels in the wallpaper image 208 having a particular luminance value (e.g., 0-255). As shown in the histogram 344, image data of the yellow flower on a white background 208 has many pixels with higher luminance values.

A percentile 356 of pixel luminance values is set based on the minimum image quality acceptable for use by the display 104 (FIG. 1). The percentile is typically set by the manufacturer of the electronic device 102 (FIG. 1). In this example, the percentile 356 is set to 75.

A calculated level 354 indicates the minimum luminance level for the given percentile 356 of the pixel luminance values. In the example, the level 354 is equal to 210 out of a possible 255. In other words, 75% of the pixels in the image data are equal to or less than luminance level 210. This level 354 information will later be used in conjunction with FIG. 6 to determine an estimated power required to display the image as a wallpaper image.

Figure 4:
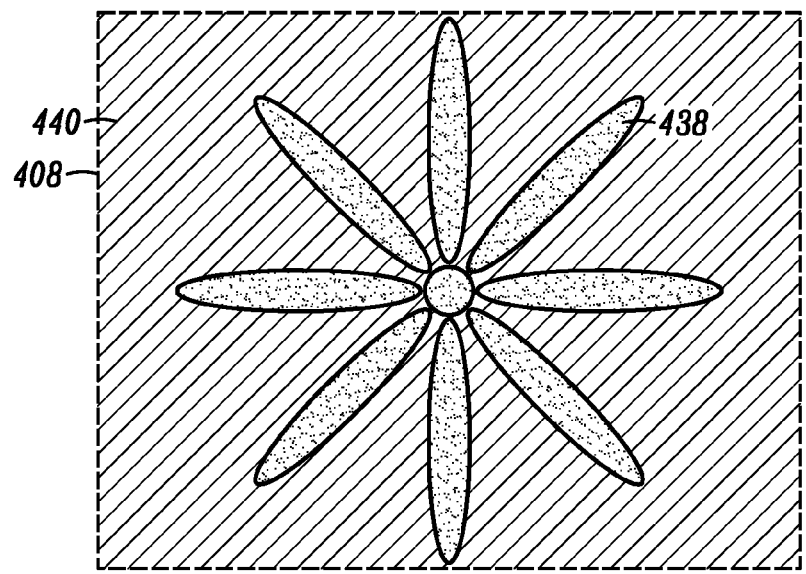
FIG. 4 depicts an embodiment of a wallpaper image similar to the wallpaper image of FIG. 1 where the petals are blue and the background is purple.
Figure 5:
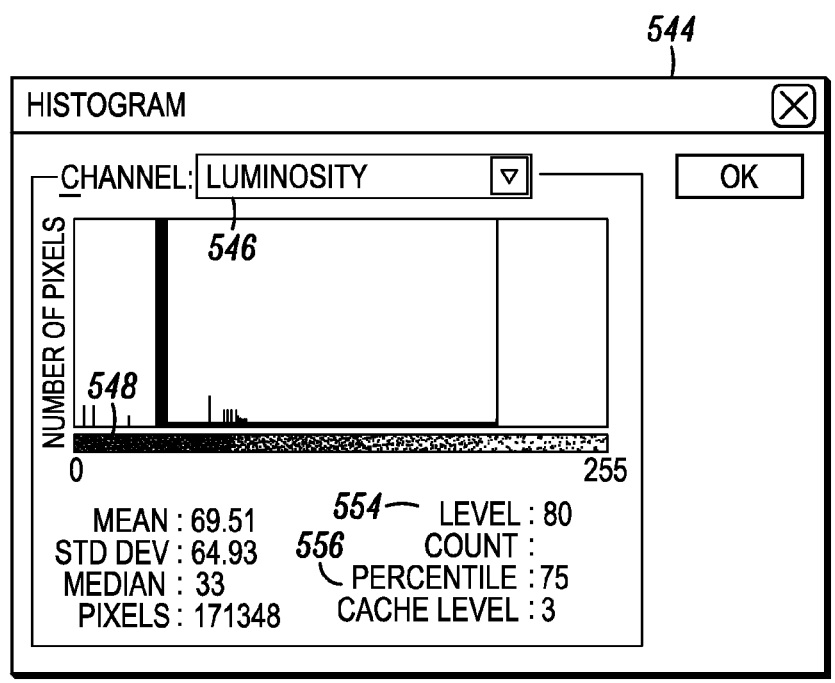
FIG. 5 depicts an embodiment of histogram information of the wallpaper image of FIG. 4.

FIG. 4, as mentioned above, depicts an embodiment of a wallpaper image 408 similar to the wallpaper image 108 (see FIG. 1) depicted on the display 104, however the petals 438 are blue and the background 440 is purple.

FIG. 5 depicts an embodiment of histogram 544 information of the wallpaper image 408. The luminosity 546 is characterized by a brightness gradient on the x-axis 548, where the lowest level of luminance is on the x-axis to the left and the highest level of luminance is on the x-axis to the right. On the y-axis is the number of pixels in the wallpaper image 408 at a particular luminance value. As shown in the histogram 544, the image data of the blue flower on a purple background 408 has many pixels at lower luminance values with fewer pixels at medium luminance values. The percentile 556 remains at 75 as set by the manufacturer of the electronic device, and the calculated level 554 is equal to 80 out of a possible 255. In other words, 75% of the pixels in the image data are equal to or less than luminance level 80. It is understood that any image data can be used to characterize properties of a wallpaper image 108 (see FIG. 1) as long as the image data can be correlated to an estimated power required to display the image as wallpaper. This level 554 information will be used in conjunction with FIG. 6 to determine an estimated power required to display the image as a wallpaper image.

Figure 6:
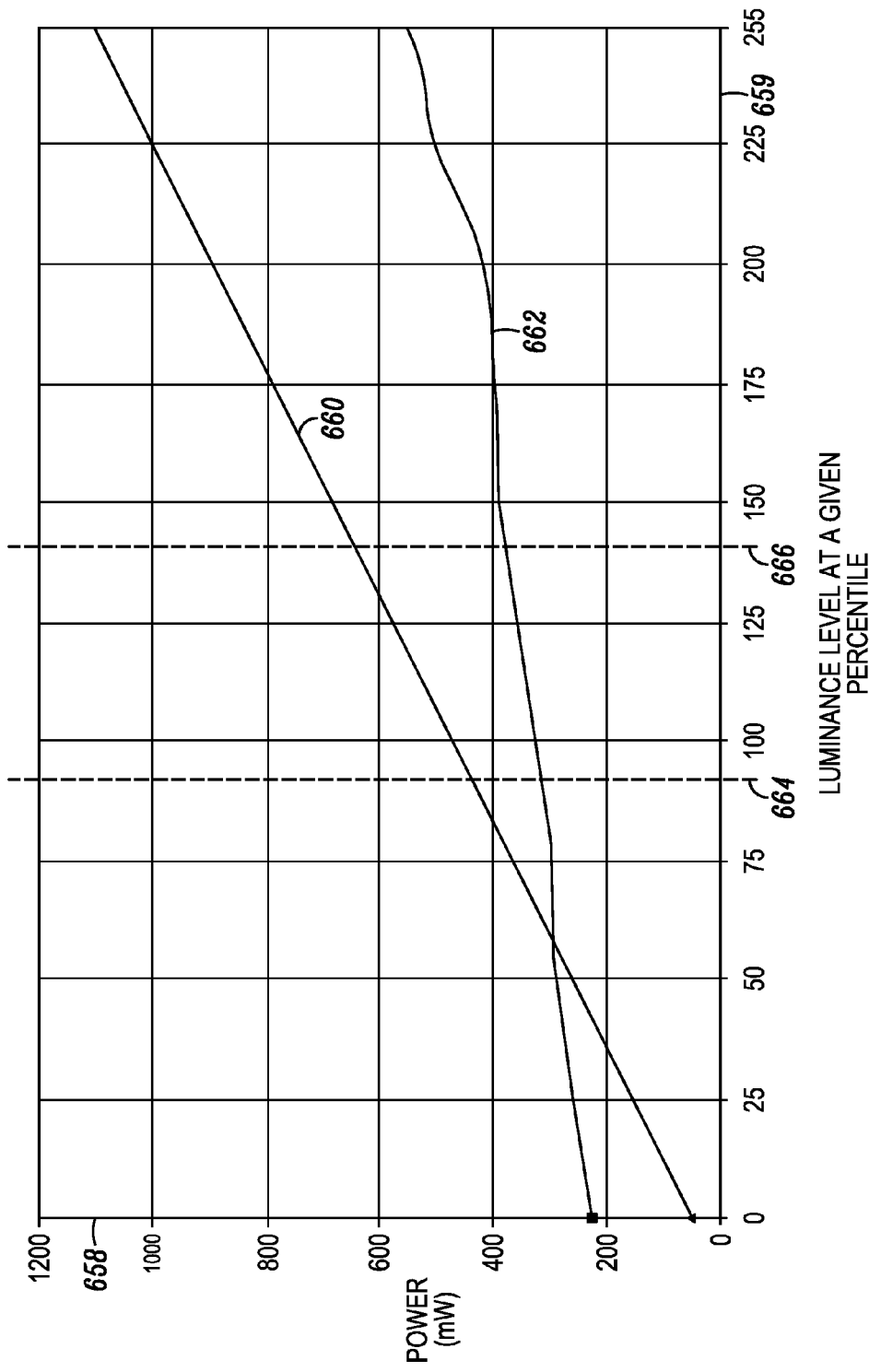
FIG. 6 is a graph to illustrate power consumption on the vertical axis and the luminance level for a given percentile of pixel luminance values on the horizontal axis.

FIG. 6 is a line graph to illustrate estimated power consumption on the vertical axis 658 and the luminance level at a given percentile on the horizontal axis 659. Two function lines are shown. Line 662 represents the estimated power consumption at a given luminance level for a particular (size, manufacturer, configuration) LCD with CABC. Line 660 represents the estimated power consumption at a given luminance level for a particular (size, manufacturer, configuration) active matrix organic light emitting diode (AMOLED) display. Both of these types of displays are widely used for portable electronic devices. It is understood that the present discussion is applicable to any electronic image output display technology, and different display technologies, display sizes, display manufacturers, and display configurations will have different "estimated power consumption at a given luminance level" functions.

The device 102 (see FIG. 1) can be equipped with a power saving digital signal process indicated by line 662 so that when the luminance level at a given percentile is lower, the power draw is lower. Typically such a power saving digital signal process will provide power savings in a non-linear manner. Unfortunately, these power saving digital signal processes do not reduce the current drain of images including a large percentage of white pixels. Accordingly, the line 662 climbs to meet a maximum at the right side of the graph.

As is the case with images modified by CABC, a power saving digital signal process will generate images with less luminosity based on their content so that they will have a lower impact current drain than those with more luminance. As mentioned previously, certain colors of displayed images consume more power than other colors depending on the display technology and materials used. Sample image characteristic threshold levels are illustrated by the dashed lines 664 and 666, separating the zone related to Low Usage 128 (see FIG. 1) (e.g., below dashed line 664), the zone related to Medium Usage 126 (e.g., below dashed line 666), and the zone related to High Usage 124 (e.g., anywhere on the graph). The image characteristic thresholds can be set at any number and in any suitable positions to create more or fewer zones, to create non-overlapping zones, and/or to create zones of different widths. Consequently, there may be more or fewer power management profile 122 options than shown in the example of FIG. 1.

In this situation, the image characteristic is luminance level at a given percentile and image characteristic thresholds are particular values of luminance level at a given percentile. An alternate formulation that obtains the same results involves using y-axis values to set low-medium-high power consumption boundaries and finding the corresponding x-axis values to determine image characteristic thresholds that reflect the y-axis boundaries. The y-axis values can be set as actual values (e.g. 425 mw and 650 mw) or as a percentage of a maximum power output of the display (e.g. 50% and 66%). It is understood that any image characteristic and its power-consumption-related image characteristic threshold is within this discussion.

The horizontal axis 659 of the graph, which currently represents luminance level at a given percentile, can be replaced with an alternate measurement such as mean luminance, median luminance, percentage of white pixels, and/or any other suitable value inherent (or derivable) from an image file that affects power consumption. Of course, the image characteristic thresholds may need to be adjusted based on these alternate measurements.

Receiving an image characteristic threshold such as indicated by lines 664 and 666 may occur in any suitable manner. As described above, receiving an image characteristic threshold may include getting user interface input selecting a power management profile 122 (see FIG. 1) of the electronic device 102 and associating the selected power management profile 124, 126, or 128 to an image characteristic threshold indicated by line 664 or line 666. As mentioned, if the power management setting is set at low usage 128, the lower threshold 664 could be set as an upper bound. If the power management setting is set at medium usage 126, the upper threshold 666 could be set as an upper bound. And if the power management setting is set a high usage 124, there would be no upper bound. In another embodiment, receiving an image characteristic threshold includes retrieving a default image characteristic threshold from the memory indicated by line 664, line 666, or one or more different vertical lines.

From FIG. 3, the luminance level 354 for a given percentile of pixel luminance values was calculated as 210 (out of a possible 255). From FIG. 6, a luminance value of 210 exceeds the higher threshold value 666 of approximately 140. Thus, the electronic wallpaper image 208 (FIG. 2) of a yellow flower on a white background could be displayed if the power management profile setting 122 (FIG. 1) was selected as high usage 124. But, if the power management profile setting 122 was medium or low usage, with the warning 130 selected, a warning would appear if the user attempted to set the image 208 as electronic wallpaper.

From FIG. 5, the luminance level 554 for a given percentile of pixel luminance values was calculated as 80 (out of a possible 255). From FIG. 6, a luminance value of 80 is below the lower threshold value 664 of approximately 90. Thus, the electronic wallpaper image 408 (FIG. 4) of a blue flower on a purple background could be displayed if the power management profile setting 122 (FIG. 1) was selected as high usage 124, medium usage 126, or low usage 128.

Figure 7:
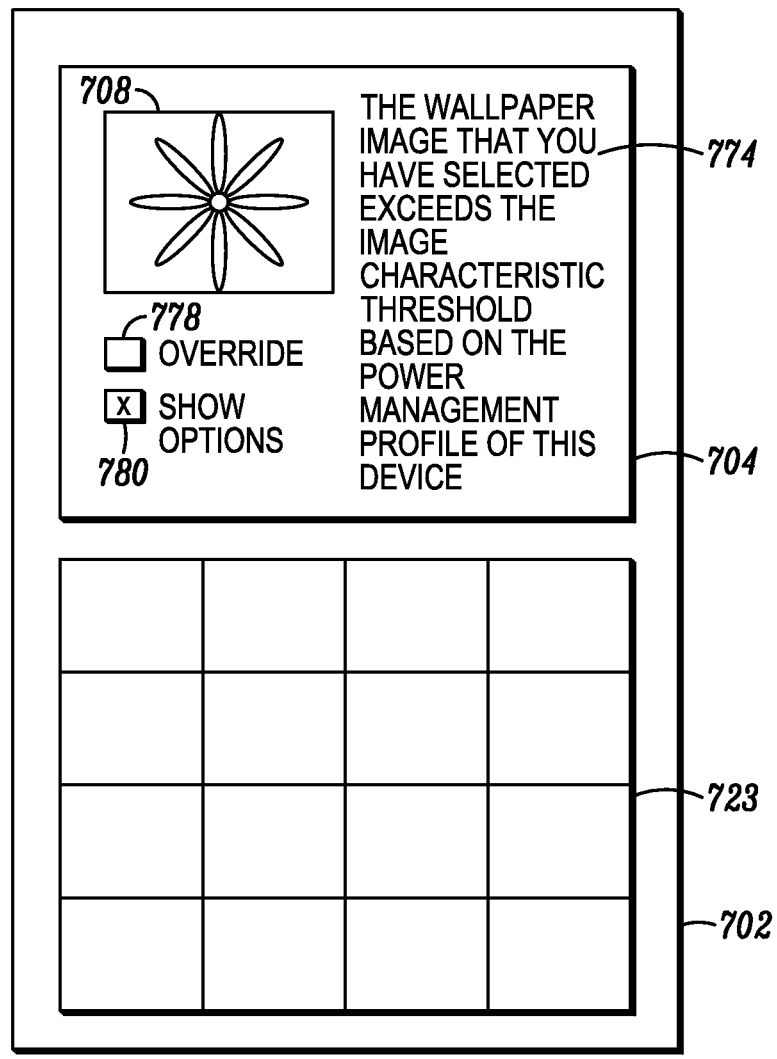
FIG. 7 depicts an embodiment of a user interface of an electronic device including a preview of a user-chosen wallpaper image upon the display.

FIG. 7 depicts an embodiment of a user interface of an electronic device 702 (such as the electronic device 102 of FIG. 1) including a thumbnail version of a user selected image 708 for electronic wallpaper upon the display 704. The device 702 can determine a power management profile 122 setting (see FIG. 1) of the electronic device that was input by the user, or that is provided by default, and associate the power management profile 122 setting to at least one predetermined image characteristic threshold 664 or 666 (see FIG. 6). That is, if the user selected a low usage profile 128 (FIG. 1) and that choice corresponded to a luminance level of 90 at a given percentile (lower threshold value 664), then selection of image 708 may result in a user interface notification that using the image as the electronic wallpaper would exceed the user-selected power management profile parameters. Moreover, the device 702 can determine whether a luminance level at a given percentile of the desired wallpaper image 708 is greater than the luminance level value (e.g., level 664) that is set as the image characteristic threshold value.

As mentioned above, referring to FIG. 1, in one embodiment, the power management profile settings window 122 can include a menu item 130 so that a user may be warned when a selected wallpaper exceeds a selected image characteristic threshold such as the luminance level at a given percentile corresponding to a user-selected high usage 124, medium usage 126, or low usage 128. Alternatively, the user can be warned by default.

A user may choose an image 708 and initiate setting it as an electronic wallpaper image. The user interface depicted on the display 704 can provide a user notification relating to the image characteristic, for example, if a luminance level at a given percentile of the image 708 is greater than the selected image characteristic threshold (e.g. level 664). The current drain impact message annunciated 774 in this embodiment is "the wallpaper image that you have selected exceeds the image characteristic threshold based on the power management profile of this device." The manner in which the current drain impact is presented to the user can take any form. For example, a bar graph representing current drawn can be provided. Additionally or alternatively, the user interface can provide a list of actions the user can take to reduce current drain other than changing the wallpaper image. In another embodiment, the device 702 can modify the image so that its impact on the current drain is less.

Figure 8:
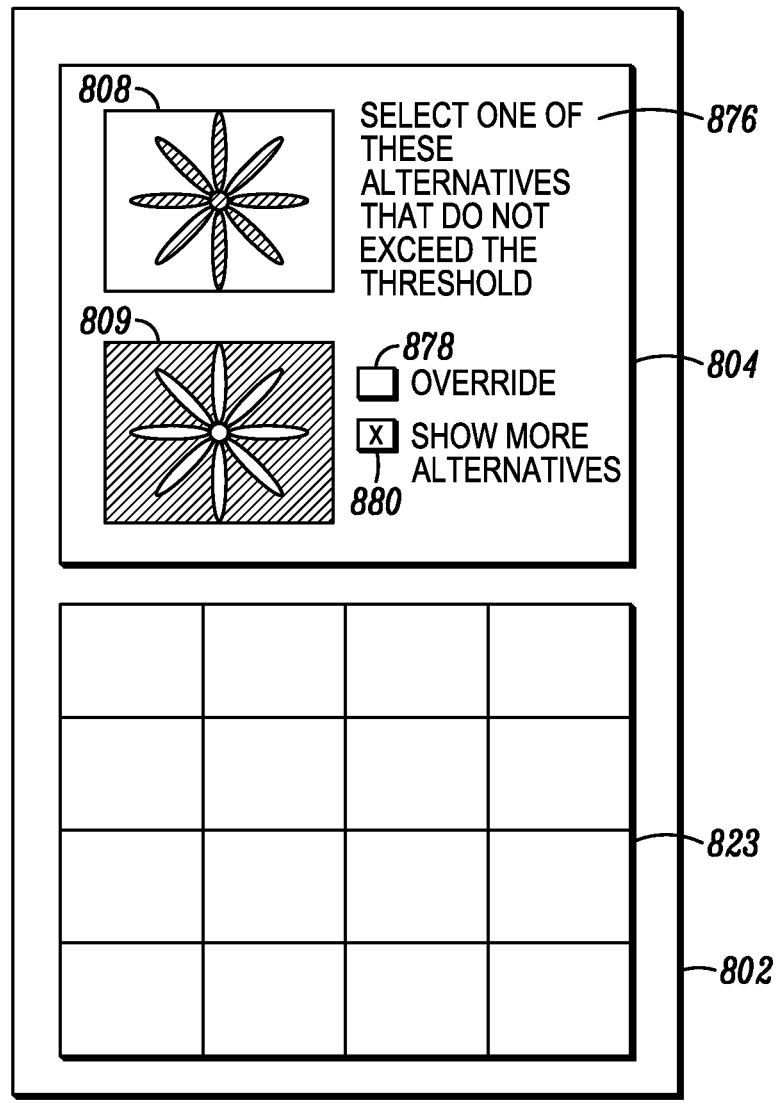
FIG. 8 depicts an embodiment of a user interface of an electronic device including a plurality of wallpaper image alternatives upon the display.

For example, in FIG. 8 the device 802 can change the colors, content, contrast or any other suitable parameter of the image 708 so that alternate images 808 and 809 (based on image 708) have less luminance and/or less current drain impact. Modified images can be presented to the user, or the modification of an image can occur by default.

In one embodiment, the power management profile 122 (see FIG. 1) may simply bar the chosen image 708 from being used as an electronic wallpaper image. It may be preferable to give the user an option; because a user utilizes wallpaper images to personalize their devices, a user may or may not wish to conserve power if a particular image cannot be used as a result. In another embodiment, the user may be provided a choice to override 778 the warning 774 and display the chosen image 708 regardless of power consumption impact, or to show alternatives 780 for the wallpaper image. The user may use touch input or keypad 723 input to select an option 778, 780. Alternatively, the user interface may provide alternatives by default (e.g., select choice 780) without instructions from the user.

FIG. 8 depicts an embodiment of a user interface of an electronic device 802 (such as electronic device 102 of FIG. 1) including a plurality of wallpaper image alternatives 808 and 809 upon the display 804. The device 802 can annunciate a prompt 876 for the user to "select one of these alternatives that do not exceed the threshold." Also, or in the alternative, the device 802 can annunciate a prompt 880 so that the user is given more alternatives. For example, the device 802 can prompt the user to search through the pictures stored in memory 114 to find images with low luminance, which may be presented to the user. The device 802 may prompt the user to download one or more images. It is understood that any manner in which to annunciate a particular selection of one or more wallpaper images that do not exceed a luminance level at a given percentile (or other image characteristic threshold) is within the scope of this discussion.

The device 802 can also annunciate a prompt 878 to override the image characteristic threshold limitation. That is the device 802 can receive user input, via for example keyboard 823, to display the originally selected image 708 (see FIG. 7). Overriding the image characteristic threshold can occur at any time, for example as shown in FIG. 7, an override prompt 778 can be provided. Again, in FIG. 8, an override prompt 878 can be provided. That is, the user can provide instructions to display a wallpaper image different from the alternate images 808 and 809.

Figure 9:
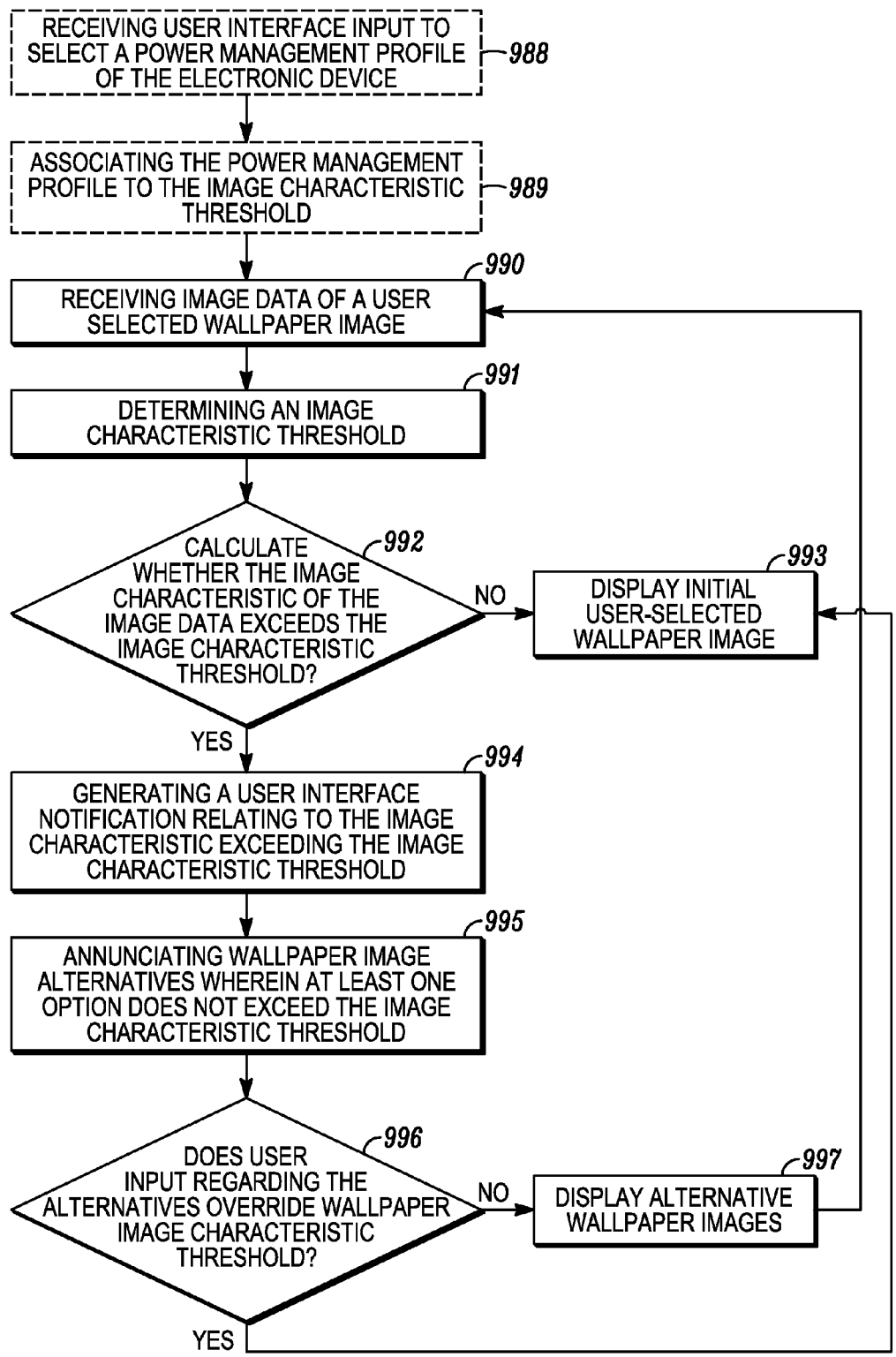
FIG. 9 is a flowchart of an embodiment of a method of a user interface of an electronic device such as a mobile communication device having a display configured to annunciate a wallpaper image.

FIG. 9 is a flowchart of an embodiment of a method of a user interface of an electronic device 102 such as a mobile communication device (see FIG. 1) having a display 104 configured to annunciate a wallpaper image 108. It is understood that the order of the steps of the depicted flowchart of FIG. 9 can be in any order, and certain ones can be eliminated, and/or certain other ones can be added depending upon the implementation.

As mentioned above, the device can store modules 116 that can carry out certain processes of the methods as described herein. Steps of methods may involve modules, and modules may be inferred by the methods discussed herein. The modules can be implemented in software, such as in the form of one or more sets of prestored instructions, and/or hardware, which can facilitate the operation of the electronic device as discussed below. A module 116 may be stored in memory 114 and be in communication with the controller 118 to carry out the process.

In one embodiment, the device 102 (see FIG. 1) can receive 988 user input to select a power management profile 122 of the electronic device. The device 102 can associate 989 the power management profile to an image characteristic threshold such as line 666 (see FIG. 6). When the device 102 receives 990 image data of a user selected wallpaper image 108, the device 102 can determine an image characteristic 991 of the image data. That is, the device 102 can retrieve and/or generate the image characteristic 991 to determine 992 whether the image characteristic of the image exceeds the image characteristic threshold. If no, the initial user-selected wallpaper image is annunciated 993 by the display 104. However, if yes, a user interface notification related to the image characteristic exceeding the image characteristic threshold is generated 994.

Upon determining 992 whether the image characteristic of the image data exceeds the image characteristic threshold value, in one embodiment, a user interface notification relating to the image characteristic can be generated 994. In another embodiment, wallpaper alternatives can be annunciated 995. It is understood that in one or more embodiments, the user can override these steps 994, 995 and instruct the device to use the initial user-selected image as electronic wallpaper.

A user may provide user input relating to the presented wallpaper alternatives. For example a user may select to review one or more alternatives or options. The method can include an option for the user to override 996 the presented alternative wallpaper images and confirm the initial user-selected wallpaper image. If no, the device 102 (see FIG. 1) can display 997 alternative wallpaper images and return to step 990 to receive a replacement user-selected wallpaper image. If yes, the device 102 can display 993 the initial user selected wallpaper image and, depending upon the implementation, not present the alternatives. Alternately, the user may view the alternatives and still confirm the initial user-selected wallpaper image.

By limiting the amount of power required to display a wallpaper image on a mobile communication device, or any device having an electronic display, power output for that wallpaper application can be minimized. As mentioned above, users often personalize their devices with images of their choosing. Different images can have different histograms of luminance values and different power output requirements. Generally speaking, the higher the luminance of an image, the higher the current drain impact caused by display of the image. The disclosed methods that could alert a user to the current drain impact of the use of certain images as wallpaper and may help a user conserve power of the device.

This disclosure is provided to explain, in an enabling fashion, the best modes of making and using various embodiments in accordance with the present invention. The disclosure is further offered to enhance an understanding, and appreciation, for the invention principles and advantages thereof, rather than to limit in any manner the invention. While the preferred embodiments of the invention are illustrated and described herein, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method of a user interface of an electronic device comprising:
    receiving image data of an image selected for an electronic wallpaper on a display of the electronic device;
    determining an image characteristic threshold value;
    calculating whether an image characteristic of the image data exceeds the image characteristic threshold value, wherein the image characteristic is correlated to an estimated current drain required to annunciate the image as the electronic wallpaper; and
    generating a user interface notification relating to the image characteristic exceeding the image characteristic threshold value, if the image characteristic exceeds the image characteristic threshold value.

2. The method of claim 1 wherein the image data comprises pixels with luminance values, and the image characteristic is a minimum luminance level representing a given percentile of the pixel luminance values.

3. The method of claim 1 wherein the image characteristic is an estimated power output associated with annunciating the image as the electronic wallpaper.

4. The method of claim 1 wherein the image characteristic is a percentage of pixels exceeding a given luminance level and the image characteristic threshold value is a maximum value for the percentage of pixels exceeding the given luminance level.

5. The method of claim 1, wherein determining an image characteristic threshold value comprises:
receiving user interface input to select a power management profile of the electronic device;
storing in a memory the power management profile; and
associating the power management profile to the image characteristic threshold value.

6. The method of claim 1, wherein determining an image characteristic threshold value comprises:
retrieving a default image characteristic threshold value from a memory.

7. The method of claim 1, wherein generating a user interface notification, comprises:
limiting annunciation of the image as the electronic wallpaper when the image characteristic exceeds the image threshold characteristic value.

8. The method of claim 1 wherein generating a user interface notification comprises:
reporting, on the user interface, the estimated current drain required to annunciate the image as the electronic wallpaper.

9. The method of claim 1 wherein generating a user interface notification comprises:
providing wallpaper image alternatives on the user interface, wherein at least one alternative has an image characteristic that does not exceed the image characteristic threshold value.

10. A method for an electronic device having a memory and a display configured to annunciate an electronic wallpaper image wherein the electronic wallpaper image can be categorized by a luminance level, the method comprising:
determining a power management profile of the electronic device;
associating the power management profile to a given luminance level which is correlated to an estimated current drain required to annunciate an image as the electronic wallpaper image; and
generating a user interface notification of excessive current drain if the luminance level of the electronic wallpaper image is greater than the given luminance level.

11. The method of claim 10, further comprising:
annunciating a selection of wallpaper images with luminance levels that do not exceed the given luminance level.

12. The method of claim 11, comprising:
receiving a user instruction to annunciate a different wallpaper image that is not one of the selection of wallpaper images.

13. A method of a user interface of an electronic device comprising:
storing a power management profile of the electronic device in a memory of the electronic device;
associating the power management profile to an image characteristic threshold;
calculating whether an image characteristic of an image exceeds the image characteristic threshold wherein the image characteristic is correlated to an estimated power usage required to annunciate the image as electronic wallpaper on a display of the electronic device; and
generating a user interface notification relating to the image characteristic exceeding the image characteristic threshold if the image characteristic exceeds the image characteristic threshold.

14. The method of claim 13 wherein the image comprises pixels with luminance values, and the image characteristic is a percentage of the pixels that exceed a given luminance level.

15. The method of claim 13 wherein the image characteristic is an estimated power output required to annunciate the image on the display as the electronic wallpaper, and an image characteristic threshold value is a percentage value of a maximum power output of the display.

16. The method of claim 13 wherein generating a user interface notification comprises:
annunciating an estimated current drain for using the image as the electronic wallpaper.

17. The method of claim 13 wherein generating a user interface notification comprises:
reporting, on the user interface, an estimated current drain required to annunciate the image as the electronic wallpaper.

18. The method of claim 13 wherein generating a user interface notification comprises:
annunciating wallpaper image alternatives, wherein at least one alternative has an image characteristic that does not exceed the image characteristic threshold.

19. The method of claim 13 wherein image data for the image comprises pixels with luminance values, and the image characteristic is a minimum luminance level representing a given percentile of the pixel luminance values.

\* \* \* \* \*